L. DUFEK.
SPRING ATTACHMENT FOR AUTOMOBILES.
APPLICATION FILED MAY 3, 1918.
1,283,116.                              Patented Oct. 29, 1918.
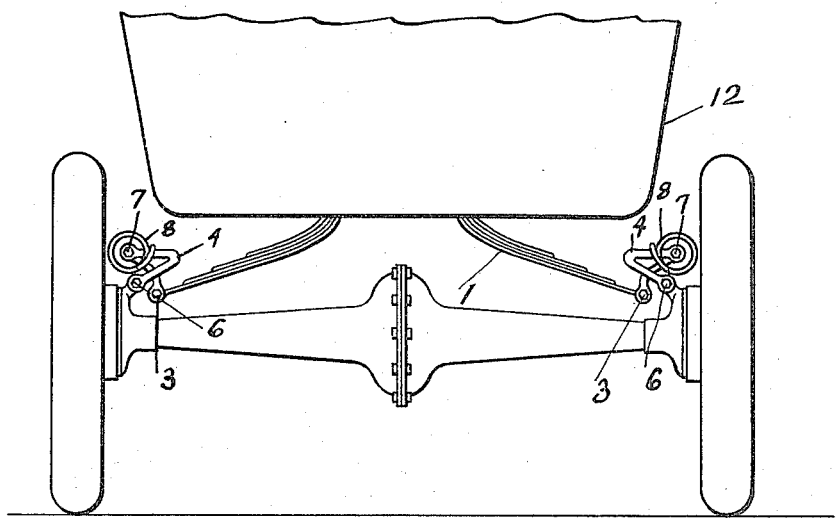
Fig. 1.
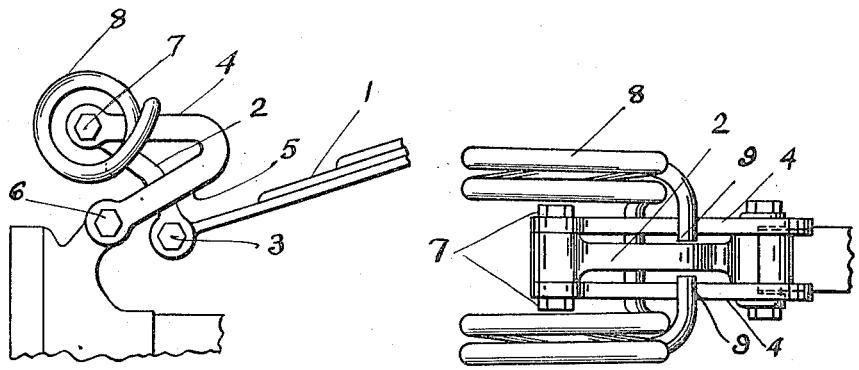
Fig. 2.                 Fig. 3.
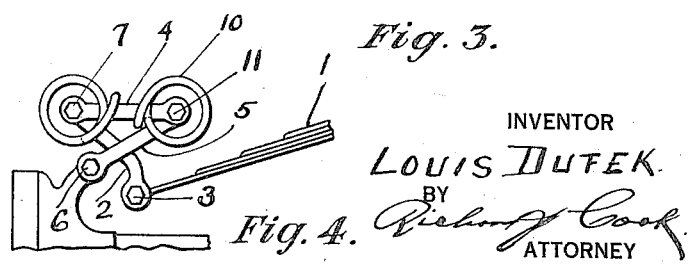
Fig. 4.
INVENTOR
LOUIS DUFEK.
BY
ATTORNEY

UNITED STATES PATENT OFFICE.

LOUIS DUFEK, OF TACOMA, WASHINGTON.

SPRING ATTACHMENT FOR AUTOMOBILES.

1,283,116.                    Specification of Letters Patent.    Patented Oct. 29, 1918.

Application filed May 3, 1918. Serial No. 232,399.

*To all whom it may concern:*

Be it known that I, LOUIS DUFEK, a citizen of the United States, residing at Tacoma, in the county of Pierce and State of Washington, have invented new and useful Improvements in Spring Attachments for Automobiles, of which the following is a specification.

This invention relates to improvements in spring attachments for vehicles, and particularly spring attachments applicable to Ford automobiles, and the object of this improvement is to provide a spring attachment that can be easily and quickly secured to the springs of any vehicle.

The invention consists in the novel construction and combination of parts as will be more fully described in the following specification, illustrated in the accompanying drawings and finally pointed out in the appended claims.

In the drawings, Figure 1 is a side elevation of the spring attachment as it appears when installed upon the rear springs of an automobile; Fig. 2 is an enlarged view in side elevation of the same; Fig. 3 is a plan view thereof; and Fig. 4 is a side elevation of an alternative construction.

Referring more particularly to the drawings, in which like reference numerals indicate like parts, the numeral 12 represents the rear of an automobile mounted on springs 1 of general application to many makes of cars. These springs are disconnected at both ends from their pivotal connection with the front and rear axles and interposed between the springs 1 and their pivotal connections with the axles is my improved spring attachment which comprises a link 2 that is pivoted upon the transverse pin 3 of the spring 1. This link is extended upwardly at a slight inclination from the vertical and forms a pivotal connection with the upper end of V shaped bars 4 disposed on the adjacent sides thereof. The upper ends of the bars 4 are extended inwardly in a horizontal plane, thence curved and extended outwardly and pivotally attached to the transverse pin 5 on both sides thereof where formerly the spring 1 was attached to the car.

8 is a spring that is extended beneath the upper end of the link 2 and is formed with a plurality of laterally disposed coils on both sides of the upper ends of the V shaped bars 4, the ends of the spring 8 being adapted to repose upon the respective upper sides of the bars 4.

It is obvious that downward pressure upon the springs 1 will be communicated to the link 2 and such link coming in contact with the spring 8 therebeneath compresses the coils on both sides thereof and thus imparts a secondary spring resiliency to the springs 1 of the vehicle.

In Fig. 4 is shown an alternative construction which differentiates from the construction above referred to only in that the integrally curved portions that form the V shaped bars 4 are linked together, as at 11, instead, and a similarly formed spring 10 is adapted to be disposed in the same manner therearound to impart an additional spring resiliency.

It is to be understood that various changes in the details of construction can be resorted to within the scope of the following claims.

What I claim as new, and desire to protect by Letters Patent, is:

1. In combination with a spring, an attachment therefor comprising a plurality of linked members forming elbows in staggered relation, one end of said linked members adapted to be pivotally attached to the ends of said springs, and the other end of said linked members adapted to be attached to the axle of the vehicle and a secondary spring disposed in yielding contact around the elbows of said linked members whereby a supplemental resiliency is imparted to the main springs of said vehicle.

2. In combination with a spring, an attachment therefor comprising a link pivotally attached to the ends of said springs and extended upwardly at an angle therefrom, a V shaped member pivotally connected to the upper end of said link and extended downwardly and pivotally attached to the axle of the vehicle, and a secondary spring disposed in yielding contact with the upper end of said link and V shaped member whereby a supplemental yielding resiliency is imparted to the main springs of said vehicle.

Signed at Tacoma, in the county of Pierce and State of Washington this 21st day of April, 1918.

LOUIS DUFEK.

Witnesses:
 R. J. COOK,
 HENRY H. THEDNIGA.

Copies of this patent may be obtained for five cents each, by addressing the "Commissioner of Patents, Washington, D. C."